Dec. 14, 1965  J. VAN POOL  3,223,650
REGENERATION OF CONTACT MATERIAL
Filed March 26, 1962
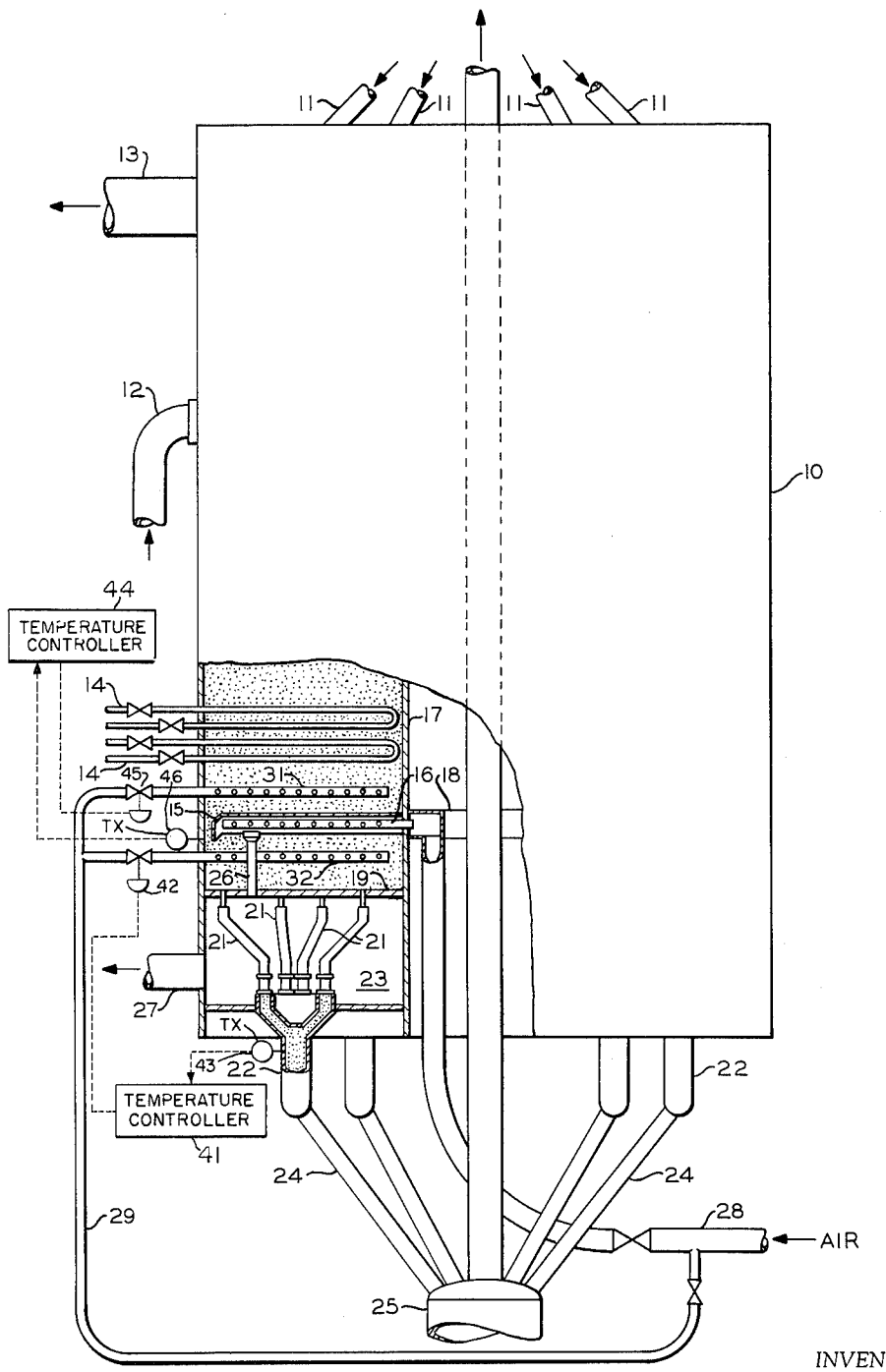
INVENTOR.
JOE VAN POOL
BY *Young & Quigg*
ATTORNEYS United States Patent Office 3,223,650
Patented Dec. 14, 1965

3,223,650
REGENERATION OF CONTACT MATERIAL
Joe Van Pool, Bartlesville, Okla., assignor to Phillips Petroleum Company, a corporation of Delaware
Filed Mar. 26, 1962, Ser. No. 182,160
7 Claims. (Cl. 252—418)

This invention relates to method and apparatus for the removal of deposits from particle materials. In one aspect the invention relates to the removal of deposits from contact material which has been utilized in the conversion of fluid reactants. In another aspect the invention relates to improved method and apparatus for burning deposits on conversion catalyst particles for removal of at least a portion therefrom. In yet another aspect the invention relates to improved method and apparatus for controlling the outlet catalyst temperature in a catalyst regenerator.

Although this invention will be disclosed with particular reference to catalytic cracking, other conversion processes are contemplated, such as hydrogenation, dehydrogenation, cyclization, polymerization, and reforming. In all these conversion processes, a carbonaceous deposit is formed on the surface of the contact material which deposit interferes with the contact material's performance as a catalyst and heat carrying medium. It is customary in the art to remove these deposits by burning in the presence of a combustion-supporting gas, such as air.

In U.S. Patent 2,941,956 by Eric V. Bergstrom, issued on June 21, 1960, there is disclosed a method and apparatus for regenerating fouled contact mass material used in the conversion of fluid reactants wherein the particle-form contact material is passed downwardly through a burning zone or kiln as a substantially compact column of gravitating particles, combustion air is introduced into the burning zone and split into two streams at an intermediate point thereof, one stream passing upwardly through the column to burn off part of the contaminant on the gravitating particle-form material and be withdrawn from the upper section of the column, the second stream passing downwardly through the column to burn off additional amounts of contaminant from the material and be withdrawn from the column into substantially particle-free flue-gas withdrawal regions in the lower section of the column, the particle-form material and gas is cooled in an indirect heat exchange zone located just above the particle-free flue-gas withdrawal regions, cooling air is introduced into the particle-free flue-gas withdrawal regions at a temperature not substantially higher than atmospheric temperature and at a flow rate to provide a ratio of flue gas to air in the particle-free flue-gas withdrawal regions between about 9:1 and about 1:1, the amount being sufficient to prevent afterburning, the flow rate of the cooling air is adjusted to trim the temperature of the contact material in the neighborhood of the particle-free flue-gas withdrawal regions to a selected temperature, the mixture of flue-gas and cooling air is removed from the particle-free flue-gas withdrawal regions, and the contact material is withdrawn from the bottom of the compact column.

However in some operations difficulty has been encountered in providing sufficient cooling capacity to obtain the desired outlet temperature. In some operations the temperature of the particle-form material and the flue-gas mixture above the flue-gas withdrawal zone reaches the temperature at which afterburning occurs, resulting in damage to the indirect heat exchanging coils and the flue-gas withdrawal equipment.

Accordingly it is an object of this invention to provide improved method and apparatus for regenerating solid particle-form contact mass material. Another object of the invention is to provide improved method and apparatus for achieving better control of outlet catalyst temperature. Another object of the invention is to eliminate or substantially reduce the occurrence of afterburning in the regenerator. Yet another object of the invention is to provide for increased conversion of carbon to carbon monoxide rather than to carbon dioxide so that less heat is produced in the kiln, or at the same heat load more carbonaceous material can be combusted. Still another object of the invention is to effect a more complete separation of the flue gas from the particle-form contact material. Another object of the invention is to provide for more efficient cooling of the regenerated particle-form contact material.

Other objects, aspects, and advantages of the invention will be apparent from a study of the disclosure, the drawing, and the appended claims.

In accordance with one embodiment of the invention a portion of the cooling air conventionally added to the flue-gas removal channels in the lower part of the regenerator is added directly to the downwardly moving bed of particle-form contact material at a locus above the flue-gas removal equipment and below the indirect heat exchange coils.

In accordance with another embodiment of the invention a portion of the cooling air conventionally added to the flue-gas removal channels in the lower part of the regenerator is added directly to the downwardly moving bed of particle-form contact material at a locus below the flue-gas removal equipment and above the contact material withdrawal zone.

Referring now to the drawing there is shown an elevation view, partly in section, of a regenerator or kiln embodying the invention. Spent catalyst having carbonaceous deposit thereon is introduced into regenerator 10 through a plurality of feed conduits 11. Combustion air is passed through one or more inlet ducts 12 provided at spaced intervals around regenerator 10. A portion of the flue gas resulting from the burning of the deposits on the particle-form contact material passes upwardly through the bed of contact material and is removed through duct 13. Since the particle-form contact material entering through conduits 11 is relatively cool, e.g. about 900° F., the flue gas removed through duct 13 does not have the requisite temperature to produce afterburning. The remainder of the flue gas passes downwardly through the portions of the bed which have already been subjected to the heat of combustion, resulting in additional burning and even higher temperature e.g. 1050 to 1150° F.

One or more indirect heat exchanging coils 14 are located in a lower section of the bed to withdraw heat from the descending particle-form contact material and flue gas. Below cooling coils 14 is located a plurality of radially-directed inverted channels or flue gas collectors 15. These downwardly-directed troughs provide suitable shielded chambers into which the flue-gas can be withdrawn from the gravitating particle-form contact material. The channels can be progressively wider from inner end to outer end and are blocked off on the outer ends. Perforated pipes 16 enter through the wall 17 under each channel and connect in the central core space of regenerator 10 with a ring-type header 18. Below the flue gas collectors 15 is located a horizontally disposed plate 19. A plurality of downwardly-directed conduits 21 feed the contact material from the bottom of the bed to outlet pipe 22. Plate 19 and conduits 21 define a plenum chamber 23 in the bottom of the regenerator 10. The particle-form contact material is passed from outlet pipes through conduits 24 into a lift tank 25. The flue gas is removed from the enclosed region under channels 15 through the downwardly-directed pipes 26 into the plenum chamber 23. Contact material carried over by the gas through the pipes 26 is separated in the plenum chamber 23 and returned to the contact material withdrawal stream through outlet pipe 22. Particle-free gas is withdrawn through outlet conduit 27 to a flue gas stack (not shown).

Relatively cool air, e.g. atmospheric temperature, is passed through line 28 to ring header 18, and then through perforated pipes 16 into the region under channels 15. The cool air mixes rapidly with the hot flue gas withdrawn from the bed, cooling it substantially. This cool air also cools channels 15, pipes 26, plate 19, and conduits 21, thus cooling the contact material by indirect heat exchange.

In accordance with the invention cool air is passed through line 29 and introduced directly into the bed of contact material through perforated pipes 31 and 32. Pipe 31 is located at a distance above channels 15 and below cooling coils 14. Air passing through perforated pipe 31 mixes directly with the flue gas and contact material and substantially reduces the temperature thereof, thus completely eliminating or substantially reducing the possibility of afterburning in the area. The flow of air through pipe 31 can be controlled to increase the back pressure on the burning zone, thus forcing a larger portion of the flue gas upwardly through the bed and reducing the oxygen concentration in the burning zone. As the contact material in the upper portion of the bed is relatively cool, the flue gas will be cooled below the temperature at which afterburning can occur, thus increasing the percentage of the carbon converted to carbon monoxide rather than carbon dioxide. As approximately 10,140 B.t.u. are released per pound of carbon converted to carbon monoxide in comparison to the release of approximately 14,500 B.t.u. per pound of carbon converted to carbon dioxide, this results in a decrease in the overall heat release and thus increases the capacity of the regenerator.

Pipe 32 's located in the bed of contact material below channels 15 and above plate 19. Air passing through perforated pipe 32 mixes directly with the contact material, substantially cooling the contact material, and aids in separating any remaining flue gas from the contact material below channels 15. As most of the flue gas has already been withdrawn into channels 15, the air from pipe 32 has to cool only the contact material itself thus providing more efficient cooling. Accurate control of the outlet temperature of the contact material can be obtained through manipulation of the temperature and/or rate of flow of the air in pipe 32.

While only one pipe 31 and one pipe 32 have been illustrated for purposes of simplicity, a plurality of pipes uniformly distributed over the cross-section of the contact material bed can be utilized at both locations. The perforated pipes 31 and 32 can be connected to the air supply either from the exterior of the regenerator 10 or by ring headers similar to ring header 18. The air flow and air temperature for pipes 31 and 32 can be controlled by common equipment or by separate means. Suitable means, such as a temperature controller, can be utilized to control the temperature and/or rate of flow of air for pipes 31 and 32. For example temperature controller 41 can regulate valve 42 in pipe 32 responsive to the temperature of the contact material in outlet pipe 22 as indicated by temperature transmitter 43. Similarly, temperature controller 44 can regulate valve 45 in pipe 31 responsive to the temperature of the contact material in the region adjacent or above channels 15 as indicated by temperature transmitter 46.

The following example is presented to further illustrate the invention, but should not be construed in limitation thereof:

*Specific example*

|  | I Invention | II Prior Practice | III High Catalyst Throughout | IV Higher Coke on Catalyst |
|---|---|---|---|---|
| Catalyst: |  |  |  |  |
| Type | (1) | (1) | (1) | (1) |
| Size, U.S. Standard Sieve Scale, Mesh | 4 to 10 | 4 to 10 | 4 to 10 | 4 to 10 |
| Spent Catalyst (conduits 11), Coke, wt. percent | 1.5 | 1.5 | 1.5 | 1.8 |
| Regenerated Catalyst (conduits 24), Coke, wt. percent | 0.3 | 0.3 | 0.3 | 0.3 |
| Catalyst (conduit 11), Temp., °F | 900 | 900 | 900 | 900 |
| Catalyst (above coil 14), Temp., °F | 1150 | 1200 | 1200 | 1200 |
| Catalyst (below coil 14), Temp., °F | 1100 | 2 1150 | 1150 | 1150 |
| Catalyst (below conduit 31), Temp., °F | 1090 | 1150 | 1140 | 1140 |
| Catalyst (conduits 24), Temp., °F | 1085 | 1145 | 1135 | 1135 |
| Flow through Kiln, Tons/Hr | 235 | 235 | 280 | 235 |
| Flue Gas (13): |  |  |  |  |
| Volume, SCF/Hr | 1,140,000 | 900,000 | 1,140,000 | 1,140,000 |
| CO/CO$_2$ Volume Ratio | 1:1 | 1:1 | 1:1 | 1:1 |
| Lower Stack Temperature, °F | 850 | 835 | 860 | 860 |
| Combustion Air (12): |  |  |  |  |
| Volume, SCF/Hr | 1,500,000 | 1,500,000 | 1,500,000 | 1,500,000 |
| Temperature, °F | 90 | 90 | 90 | 90 |
| Quench Air 31 (None in 32 in this Run): |  |  |  |  |
| Volume, SCF/Hr | 420,000 | (2) | 420,000 | 420,000 |
| Temperature, °F | 90 | (2) | 90 | 90 |
| Flue Gas (27): |  |  |  |  |
| Volume, SCF/Hr | 780,000 | 1,020,000 | 780,000 | 780,000 |
| CO/CO$_2$ Volume Ratio | 0.14:1 | 0.14:1 | 0.14:1 | 0.14:1 |
| Air to Flue Gas Channels (16): |  |  |  |  |
| Volume, SCF/Hr | (2) | 420,000 | (2) | (2) |
| Temperature, °F | (2) | 90 | (2) | (2) |

1 Silica-alumina.
2 Not used.

Reasonable variation and modification are possible within the scope of the foregoing disclosure, the drawing, and the appended claims to the invention.

I claim:

1. In a process for regeneration of a solid particle-form contact mass material which has become spent by deposition of a carbonaceous deposit thereon and which exists at a temperature suitable for initiating combustion of said deposit, which process comprises: passing said particle-form solid material downwardly through a burning zone as a substantially compact column of gravitating particles, introducing a stream of combustion air into the burning zone, splitting the combustion air stream into two streams at a point intermediate the ends of the compact column of particles in the burning zone, one stream of combustion air passing upwardly through the column to burn off part of the contaminant on the gravitating particle-form material and be withdrawn from the upper section of the column, the second stream of combustion air passing downwardly through the column to burn off additional amounts of contaminant from the material and be withdrawn from the column into substantially particle-free flue-gas withdrawal regions in the lower section of the column, cooling the particle-form material and the downwardly passing second stream of combustion air and resulting flue gas in an indirect heat exchange zone located above the particle-free flue-gas withdrawal regions, introducing a first stream of cooling air directly into the particle free flue-gas withdrawal regions, withdrawing the mixture of flue gas and cooling air from the particle-free flue-gas withdrawal regions and withdrawing the contact material from the bottom of the compact column; the improvement comprising introducing a second stream of cooling air directly into the column of particle-form contact material at a point above said particle-free flue-gas withdrawal regions and below said indirect heat exchange zone to admix said second stream of cooling air directly with the downwardly passing second stream of combustion air and resulting flue gas and with said particle-form contact material to cool said downwardly passing second stream of combustion air and resulting flue gas and said particle-form contact material to a temperature at which afterburning will not occur, to thus eliminate the possibility of afterburning adjacent the particle-free flue-gas withdrawal regions.

2. A process in accordance with claim 1 further comprising manipulating at least one of the temperature and rate of flow of said second stream of cooling air.

3. In a process for regeneration of a solid particle-form contact mass material which has become spent by deposition of a carbonaceous deposit thereon and which exists at a temperature suitable for initiating combustion of said deposit, which process comprises: passing said particle-form solid material downwardly through a burning zone as a substantially compact column of gravitating particles, introducing a stream of combustion air into the burning zone, splitting the combustion air stream into two streams at a point intermediate the ends of the compact column of particles in the burning zone, one stream of combustion air passing upwardly through the column to burn off part of the contaminant on the gravitating particle-form material and be withdrawn from the upper section of the column, the second stream of combustion air passing downwardly through the column to burn off additional amounts of contaminant from the material and be withdrawn from the column into substantially particle-free flue-gas withdrawal regions in the lower section of the column, cooling the particle-form material and the downwardly passing second stream of combustion air and resulting flue gas in a heat exchange zone located above the particle-free flue-gas withdrawal regions to a temperature at which afterburning will not occur, introducing a first stream of cooling air directly into the particle-free flue-gas withdrawal regions, withdrawing the mixture of flue gas and cooling air from the particle-free flue-gas withdrawal regions and withdrawing the contact material from the bottom of the compact column; the improvement comprising introducing a second stream of cooling air directly into the substantially flue-gas free particle-form contact material which is at a temperature at which afterburning will not occur, the point of introduction of said second stream of cooling air being below the point of withdrawal of gas from the column into said substantially particle-free flue-gas withdrawal regions and above the point of withdrawing the contact material from the bottom of the compact column, to provide further cooling of said contact material, and manipulating one of the temperature and rate of flow of said second stream of cooling air to maintain the temperature of said contact material as it is withdrawn from the bottom of the compact column at the desired value.

4. A process for regeneration of a solid particle-form contact material which has become spent by deposition of a carbonaceous deposit thereon and which exists at a temperature suitable for initiating combustion of said deposit comprising passing said particle-form contact material downwardly through a burning zone as a substantially compact column of gravitating particles, passing a stream of combustion air downwardly through the burning zone, cooling in a heat exchange zone the particle-form contact material and the downwardly passing stream of combustion air and the resulting flue gas, mixing a first stream of cooling air directly with the particle-form contact material and the downwardly passing stream of combustion air and the resulting flue gas at a first point below said heat exchange zone to cool the particle-form contact material and the downwardly passing stream of combustion air and resulting flue-gas to a temperature at which afterburning will not occur to thus substantially reduce the possibility of afterburning below said first point, removing the resulting admixture of combustion air, cooling air and flue gas from said particle-form contact material at a second point below said first point, and removing at a third point below said second point particle-form contact material having a temperature at which afterburning will not occur.

5. A process in accordance with claim 4 further comprising manipulating at least one of the temperature and rate of flow of said first stream of cooling air to said mixing step.

6. A process in accordance with claim 4 further comprising mixing at a fourth point above said third point and below said second point a second stream of cooling air with the particle-form contact material having a temperature at which afterburning will not occur to further cool the particle-form contact material, and manipulating at least one of the temperature and flow rate of said second stream of cooling air to maintain the temperature of said contact material at said third point at a desired value.

7. A process for regeneration of a solid particle-form contact material which has become spent by deposition of a carbonaceous deposit thereon and which exists at a temperature suitable for initiating combustion of said deposit comprising passing said particle-form contact material downwardly through a burning zone as a substantially compact column of gravitating particles, passing a stream of combustion air downwardly through the burning zone, cooling in a heat exchange zone the particle-form contact material and the downwardly passing stream of combustion air and the resulting flue-gas, to a temperature at which afterburning will not occur, removing at a first point below said heat exchange zone flue gas from the particle-form contact material which has been subjected to deposit burning conditions and cooled in said heat exchange zone to a temperature at which afterburning will not occur, mixing a first stream of cooling air directly with the particle-form contact material from which flue gas has been removed and which is at a temperature at which afterburning will not occur, to further cool the particle-form contact material, and manipulating at least one of the temperature and rate of flow of said first stream of cooling air utilized in said mixing step to maintain the temperature of the regenerated particle-form contact material at a desired value.

References Cited by the Examiner

UNITED STATES PATENTS

| 2,816,010 | 12/1957 | Shabaker | 252—418 |
| 2,918,436 | 12/1959 | Shabaker | 252—418 |
| 2,936,221 | 5/1960 | Bergstrom | 23—288.3 |
| 2,941,955 | 6/1960 | Moulthrop | 252—418 |
| 2,941,956 | 6/1960 | Bergstrom | 252—418 |

FOREIGN PATENTS

| 667,584 | 3/1952 | Great Britain. |

MAURICE A. BRINDISI, *Primary Examiner.*